(12) United States Patent
Piramoon (10) Patent No.: US 8,323,170 B2
(45) Date of Patent: Dec. 4, 2012

(54) SWING BUCKET CENTRIFUGE ROTOR INCLUDING A REINFORCEMENT LAYER

(75) Inventor: Sina Piramoon, San Jose, CA (US)

(73) Assignee: Fiberlite Centrifuge, LLC, Santa Clara, CA (US)

( * ) Notice: Subject to any disclaimer, the term of this patent is extended or adjusted under 35 U.S.C. 154(b) by 559 days.

(21) Appl. No.: 12/429,561

(22) Filed: Apr. 24, 2009

(65) Prior Publication Data

US 2010/0273626 A1    Oct. 28, 2010

(51) Int. Cl.
*B04B 5/02* (2006.01)

(52) U.S. Cl. ............................................ 494/20; 494/81

(58) Field of Classification Search .............. 494/17–21, 494/31, 33, 43, 81, 16; 422/548; 74/572.11, 74/572.12, 572.21
See application file for complete search history.

(56) References Cited

U.S. PATENT DOCUMENTS

| | | | |
|---|---|---|---|
| 4,093,118 A | 6/1978 | Sinn et al. | |
| 4,391,597 A | 7/1983 | Piramoon et al. | |
| 4,449,966 A | 5/1984 | Piramoon | |
| 4,548,596 A | 10/1985 | Sutton, III et al. | |
| 4,585,433 A | 4/1986 | Cole | |
| 4,585,434 A * | 4/1986 | Cole | 494/20 |
| 4,586,918 A * | 5/1986 | Cole | 494/20 |
| 4,589,864 A * | 5/1986 | Cole | 494/20 |
| 4,624,655 A | 11/1986 | Cole | |
| 4,659,325 A | 4/1987 | Cole et al. | |
| 4,670,004 A | 6/1987 | Sharples et al. | |
| 4,718,885 A * | 1/1988 | Potter | 494/20 |
| 4,738,656 A | 4/1988 | Piramoon et al. | |
| 4,781,669 A | 11/1988 | Piramoon | |
| 4,790,808 A | 12/1988 | Piramoon | |
| 4,886,486 A | 12/1989 | Grimm et al. | |
| 5,057,071 A | 10/1991 | Piramoon | |
| 5,206,988 A | 5/1993 | Piramoon | |
| 5,362,301 A | 11/1994 | Malekmadani et al. | |
| 5,370,796 A * | 12/1994 | Grimwood | 210/360.1 |
| 5,382,219 A | 1/1995 | Malekmadani | |
| 5,411,465 A | 5/1995 | Glen et al. | |
| 5,505,684 A | 4/1996 | Piramoon | |

(Continued)

FOREIGN PATENT DOCUMENTS

DE    1 782 602 B    3/1972

(Continued)

OTHER PUBLICATIONS

ESPACENET, English Abstract of JP63319074(A), Published Dec. 27, 1988, retrieved on Apr. 10, 2012 from http://worldwide.espacenet.com (1 page).

*Primary Examiner* — Charles E Cooley
(74) *Attorney, Agent, or Firm* — Wood, Herron & Evans, LLP (57) ABSTRACT

A centrifuge rotor is provided. The rotor includes a compression-molded rotor body that includes a central hub defining an axis of rotation of the rotor body, and a plurality of bays, each configured to receive a bucket therein. A plurality of load transferring members are integrally molded with the rotor body and each include a bucket support for supporting a bucket, with the bucket support permitting pivoting movement of the bucket during centrifugation of the rotor body about the axis of rotation. A reinforcement layer extends circumferentially and/or helically around an exterior of the rotor body.

17 Claims, 8 Drawing Sheets

U.S. PATENT DOCUMENTS

| | | | |
|---|---|---|---|
| 5,527,257 | A | 6/1996 | Piramoon |
| 5,533,644 | A | 7/1996 | Glen et al. |
| 5,540,126 | A | 7/1996 | Piramoon |
| 5,545,118 | A * | 8/1996 | Romanauskas ............. 494/20 |
| 5,562,582 | A | 10/1996 | Malekmadani |
| 5,562,584 | A * | 10/1996 | Romanauskas ............. 494/20 |
| 5,601,522 | A | 2/1997 | Piramoon |
| 5,643,168 | A | 7/1997 | Piramoon et al. |
| 5,667,755 | A | 9/1997 | Baum et al. |
| 5,681,258 | A | 10/1997 | Lowe et al. |
| 5,683,341 | A | 11/1997 | Giebeler |
| 5,759,592 | A | 6/1998 | Piramoon et al. |
| 5,776,400 | A | 7/1998 | Piramoon et al. |
| 5,833,908 | A | 11/1998 | Piramoon et al. |
| 5,840,005 | A * | 11/1998 | Lowe et al. ............. 494/16 |
| 5,876,322 | A | 3/1999 | Piramoon |
| 5,972,264 | A | 10/1999 | Malekmadani et al. |
| 6,056,910 | A | 5/2000 | Fritsch et al. |
| 6,296,798 | B1 | 10/2001 | Piramoon |
| 6,482,342 | B1 | 11/2002 | Malekmadani et al. |
| 6,916,282 | B2 | 7/2005 | Aizawa |
| 7,150,708 | B2 | 12/2006 | Lurz |
| 8,147,392 | B2 * | 4/2012 | Piramoon et al. ............. 494/16 |
| 8,147,393 | B2 * | 4/2012 | Piramoon et al. ............. 494/20 |
| 8,211,002 | B2 * | 7/2012 | Piramoon et al. ............. 494/20 |
| 8,221,301 | B2 * | 7/2012 | Yang ............. 494/20 |
| 2010/0184578 | A1 | 7/2010 | Piramoon et al. |
| 2010/0216622 | A1 | 8/2010 | Piramoon et al. |
| 2010/0273626 | A1 | 10/2010 | Piramoon |
| 2010/0273629 | A1 | 10/2010 | Piramoon et al. |
| 2011/0111942 | A1 | 5/2011 | Piramoon |
| 2011/0136647 | A1 | 6/2011 | Piramoon et al. |
| 2012/0180941 | A1 * | 7/2012 | Piramoon et al. ............. 156/185 |

FOREIGN PATENT DOCUMENTS

| | | |
|---|---|---|
| DE | 27 49 785 A1 | 5/1979 |
| EP | 0 176 970 A2 | 4/1986 |
| EP | 0 326 680 A2 | 8/1989 |
| GB | 2469719 | 10/2010 |
| JP | 58219958 A * | 12/1983 |
| JP | 63319074 A | 12/1988 |
| JP | 2012101203 A * | 5/2012 |

* cited by examiner

SWING BUCKET CENTRIFUGE ROTOR INCLUDING A REINFORCEMENT LAYER

CROSS-REFERENCE TO RELATED APPLICATIONS

This application is generally related to U.S. patent application Ser. No. 12/429,569, filed on Apr. 24, 2009, now U.S. Pat. No. 8,211,002, the disclosure of which is incorporated herein by reference in its entirety.

TECHNICAL FIELD

This invention relates generally to centrifuge rotors and, more particularly, to high-speed centrifuge rotors to be used with swing buckets.

BACKGROUND

Centrifuges are used to separate components of collected samples of biological and other materials. The samples are typically placed in tubes or other containers configured to be received in a centrifuge rotor for rapid rotation in the centrifuge. One type of centrifuge rotor includes swinging buckets pivotally coupled to a rotor body to permit the longitudinal axes of sample tubes or containers carried on the buckets to rotate from a generally vertical orientation to a generally horizontal orientation as the rotor spins during centrifugation. To balance the dynamic forces experienced during centrifugation, swing bucket rotors are typically designed to support the swing buckets in a generally symmetric arrangement around the rotational axis.

One conventional type of swing bucket centrifuge rotor includes a generally cylindrical metallic rotor configured to support an even number of swing buckets, such as four, on diametrically opposite sides of the rotational axis of the rotor. In rotors of this type, and because of the very high rotational speeds during centrifugation, the rotor bodies must be able to withstand the dynamic stresses and forces generated by the rapid rotation of the swing buckets about the central rotational axis. These dynamic stresses and forces may lead to failure of the metallic rotor, such as fatigue failure. Additionally or alternatively, conventional metallic rotors of this type may be subject to corrosion. A need therefore exists for improved swing bucket rotors that overcome these and other drawbacks of conventional centrifuge rotors.

SUMMARY

The present invention overcomes the foregoing and other shortcomings and drawbacks of swing bucket rotors heretofore known for use in centrifugation. While the invention will be discussed in connection with certain embodiments, it will be understood that the invention is not limited to these embodiments. To the contrary, the invention includes all alternatives, modifications, and equivalents as may be included within the spirit and scope of the invention.

In one embodiment, a centrifuge rotor is provided, having a compression-molded rotor body. The rotor body includes a central portion that defines an axis of rotation of the rotor body and a plurality of bays, each bay configured to receive a bucket therein. A plurality of load transferring members are integrally molded with the rotor body. Each of the load transferring members includes a bucket support for supporting a bucket, with the bucket support permitting pivotal movement of the bucket during centrifugation. A reinforcement layer extends circumferentially around an exterior of the rotor body.

In one aspect, the rotor body may include carbon fiber. In another aspect, the reinforcement layer may include a tow or strand of carbon fiber that extends continuously around the exterior of the rotor body. For example, the rotor body may include resin-coated carbon fiber. The reinforcement layer may be integrally formed with the rotor body. Additionally or alternatively, the reinforcement layer may include a tow or strand that extends helically around the exterior of the rotor body.

At least one of the load transferring members may be generally Y-shaped, thereby defining a pair of arms, with each of the arms being configured to transfer forces from the bucket support to the rotor body. The bucket support may include a pin that is engageable with a corresponding aperture of the bucket. The rotor body may include a plurality of stacked resin-coated carbon fiber laminate layers, with each of the layers having shapes that define the plurality of bays and a plurality of openings associated with the plurality of load transferring members. Additionally or alternatively, the rotor body may include filler material, such as, and without limitation, discontinuous carbon fibers, between the layers. The load transferring members may be disposed symmetrically about the axis of rotation and adjacent the bays. At least one of the load transferring members may include a pair of circumferentially opposed bucket supports that are in communication with a respective pair of bays for supporting a respective pair of buckets in the bays. The rotor may include a plurality of buckets that are configured to hold centrifuge tubes and that are supported by the bucket supports.

In another embodiment, a centrifuge rotor is provided that includes a compression-molded carbon fiber rotor body having a central portion that includes an axis of rotation of the rotor body and a plurality of bays, with each bay configured to receive a bucket therein. The rotor includes a plurality of load transferring members that are integrally molded with the rotor body. Each load transferring member includes a pair of pins for supporting a respective pair of buckets in adjacent bays, with the pins permitting pivotal movement of the buckets during rotation of the rotor body about the axis of rotation. A reinforcement layer extends circumferentially around the exterior of the rotor body. A plurality of recesses may be formed into a bottom face of the rotor body for minimizing the weight of the rotor body.

In yet another embodiment, a method is provided for forming a centrifuge rotor. A rotor body is obtained which includes a central portion defining an axis of rotation of the rotor body and a plurality of bays, each adapted to receive a bucket therein. A reinforcement layer is applied around an exterior of the rotor body. The method may include compression-molding the rotor body. Additionally or alternatively, the method may include co-molding a plurality of load transferring members, with each of the load transferring members being adapted to support at least one of the buckets.

In one aspect, the method may include winding a strand of carbon fiber around the exterior of the rotor body. Additionally, the method may include curing a strand of carbon fiber that is coated with resin to make the strand of carbon fiber integral with the rotor body. The method may include helically winding a strand around the exterior of the rotor body. In another aspect, the method may include stacking a plurality of carbon fiber layers, with each of the layers including the plurality of bays and a plurality of openings associated with the plurality of load transferring members.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
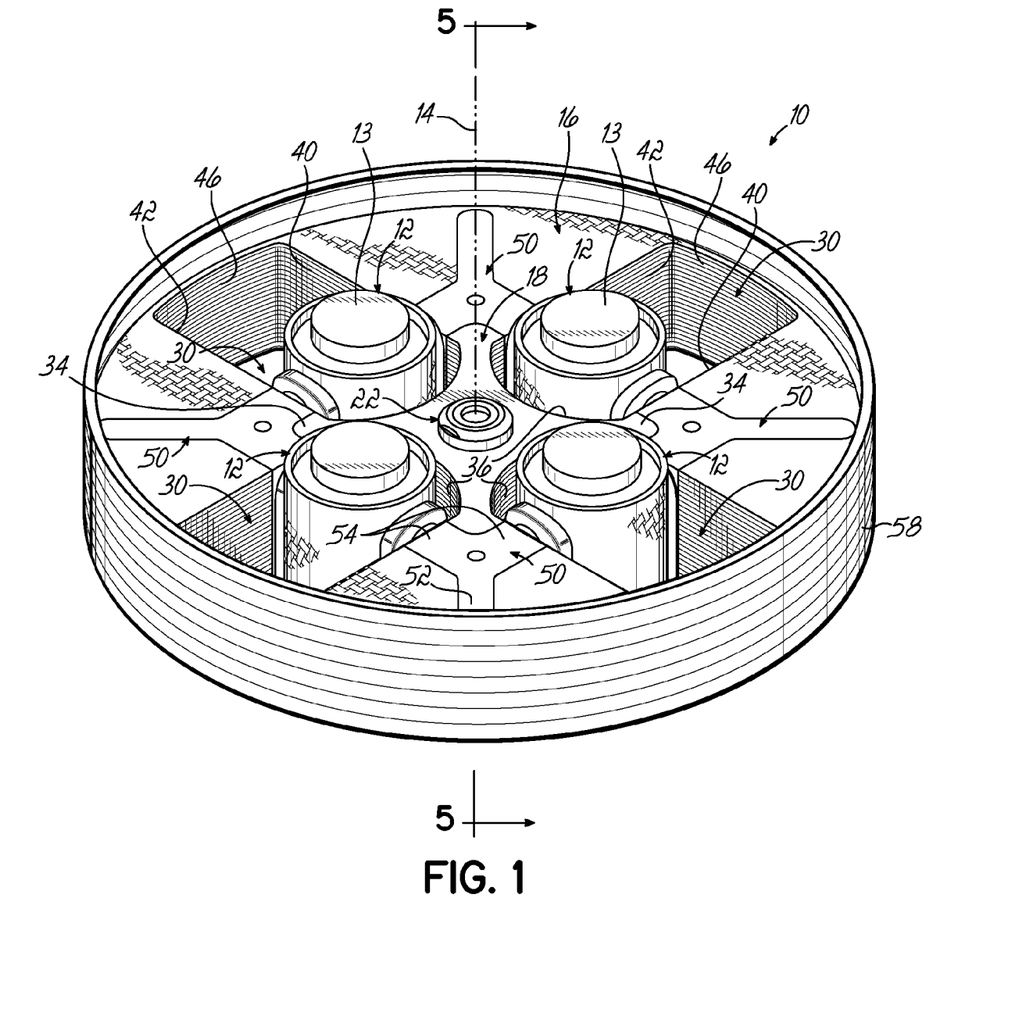
FIG. 1 is a perspective view of the top side of an exemplary centrifuge rotor assembly in accordance with one embodiment of the present invention, showing swing buckets of the assembly in a general vertical orientation.
Figure 1A:
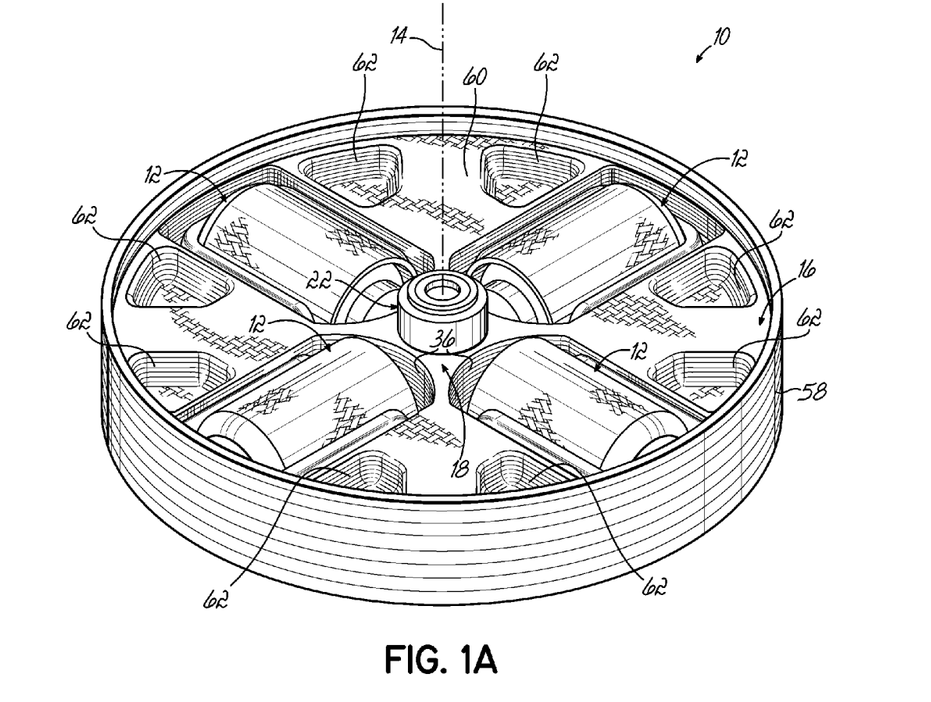
FIG. 1A is a perspective view of the bottom side of the rotor assembly of FIG. 1, showing the swing buckets in a general horizontal orientation.
Figure 2:
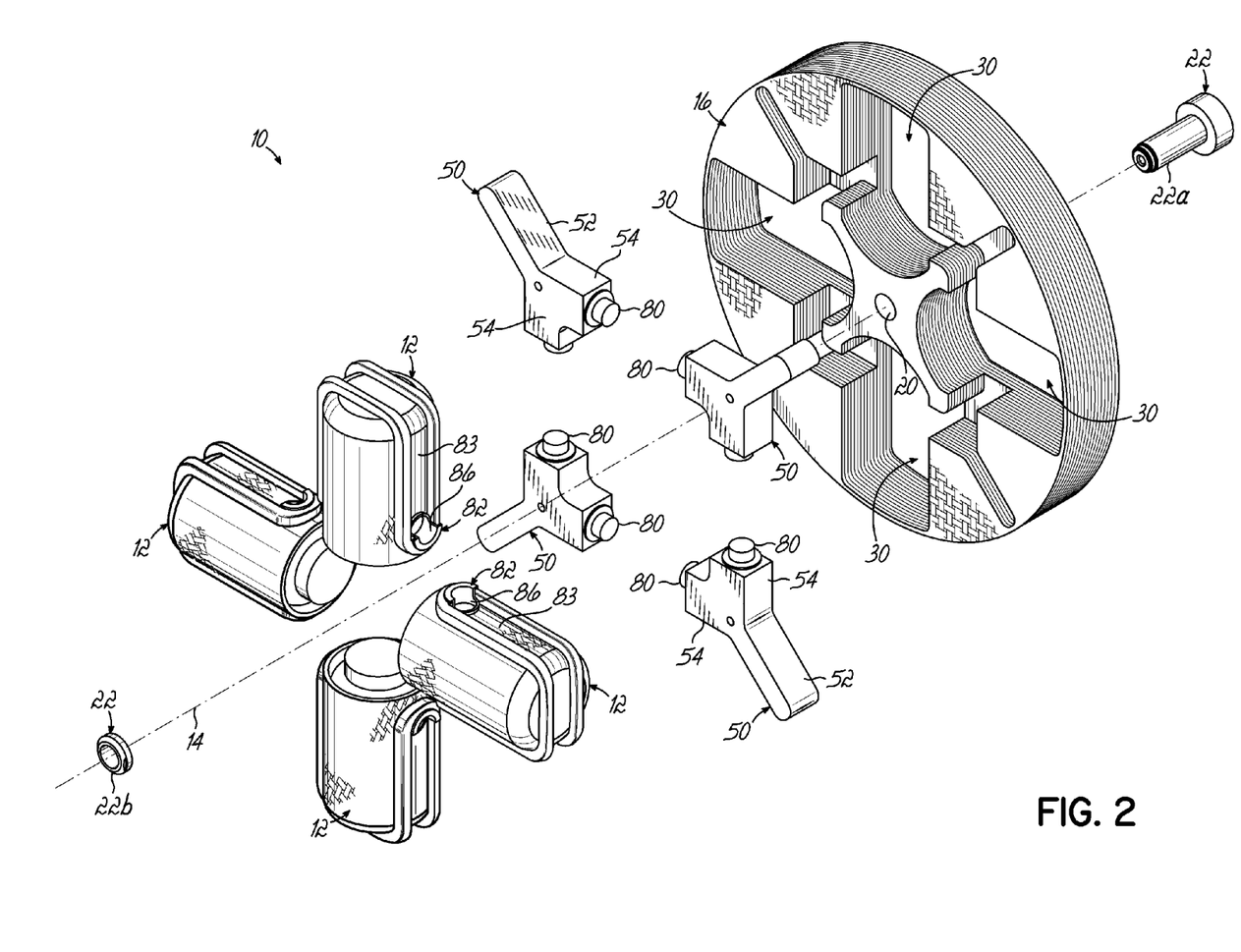
FIG. 2 is an exploded perspective view of the rotor assembly of FIG. 1.

FIGS. 1, 1A, and 2 depict an exemplary centrifuge rotor assembly 10 in accordance with one embodiment of the present invention. The rotor assembly 10 is generally cylindrical in shape and supports a plurality of swing buckets 12, each configured to hold sample tubes and/or similar laboratory-type containers 13 for centrifugal rotation thereof about a central axis of rotation 14. An exemplary bucket is disclosed in U.S. patent application Ser. No. 12/429,569, filed on Apr. 24, 2009, now U.S. Pat. No. 8,211,002, and commonly assigned to the assignee of the present Application, the disclosure of which is hereby incorporated herein by reference in its entirety.

The rotor assembly 10 includes a rotor body 16 that supports the buckets 12. The rotor body 16 includes a central portion 18 that defines the axis 14 and is engageable by a centrifuge spindle (not shown) for high speed rotation of the rotor assembly 10. More particularly, the central portion 18 includes a bore 20 (FIG. 2) suitably shaped and configured for coupling with a coupling 22 adapted to be connected to the spindle. The rotor body 16 may be formed, for example, by compression-molding and/or include carbon fiber or other suitably chosen materials.

While the embodiment herein described includes four buckets 12, it is contemplated that more or fewer buckets may be utilized without departing from the spirit or scope of the present invention. The central portion 18 cooperates with the rotor body 16 to define a plurality of bays 30, each configured to receive one of the buckets 12. In this regard, the central portion 18 includes, in this embodiment, four arms 34 extending radially-outwardly from a center of the central portion 18 to define curved front walls 36 of each of the bays 30, while other portions of the rotor body 16 define opposing side walls 40, 42 and back walls 46 of each of the bays 30. While FIGS. 1-1A illustrate a specific shape of the bays 30 and a specific shape of the buckets 12, these are illustrated as such in exemplary rather than limiting fashion, as the bays 30 may, for example, comprise any other suitably chosen shape to accommodate buckets 12 of any shape. For example, the bays 30 may be shaped to receive buckets of cylindrical shape or other shapes having rectangular, elliptical, or any other geometrical cross-section.

With continued reference to FIGS. 1, 1A, and 2, the rotor assembly 10 includes a plurality of load transferring members 50 arranged symmetrically about the axis 14 and adjacent the bays 30. In this exemplary embodiment, each of the load transferring members 50 has a generally Y-shape and is configured to support one or more of the buckets 12. More particularly, each of the load transferring members 50 includes a central leg 52 and a pair of arms 54 extending therefrom, with each of the arms 54 having a bucket support in the form, in this embodiment, of a pin 80 for supporting the buckets 12, as explained in further detail below. The pins 80 permit pivotal movement of the buckets 12 during centrifugation, such that the buckets 12 may pivot, for example and without limitation, from the generally vertical orientation shown in FIG. 1, to the generally horizontal orientation shown in FIG. 1A. During centrifugation, the radially outward forces associated with the weight of the buckets 12 and the weight of their respective contents are transferred from the buckets 12, through the pins 80, to the other portions of load transferring members 50. The load transferring members 50, in turn, transfer the forces to the rotor body 16.

With continued reference to FIGS. 1, 1A, and 2, a reinforcement layer 58 extends circumferentially around an exterior or perimeter of the rotor body 16 and provides support against the dynamic forces and stresses applied onto the rotor body 16 during centrifugation. In this exemplary embodiment, the reinforcement layer 58 includes carbon fiber and may be formed as explained in further detail below. In another aspect of this embodiment, and with particular reference to FIG. 1A, a bottom face 60 of the rotor body 16, opposite a top face 61 thereof, includes a plurality of recesses or scalloped portions 62 that minimize the weight of the rotor assembly 10, thereby reducing the dynamic stresses and forces present during centrifugation. While the recesses 62 are illustrated in FIG. 1A in a specific number, shape, and configuration, it is contemplated that these may be present in any other suitably chosen number, shape and/or configuration. Alternatively, the bottom face 60 may include no such recesses at all.

With particular reference to FIG. 2, each of the bucket supports takes the form, in one embodiment, of a pin 80 extending from an arm 54 of a load transferring member 50, with the pin 80 being engageable with a cooperating receiving aperture 82 on a side wall 83 of a bucket 12. In this regard, therefore, the arrangement of the load transferring members 50 in the rotor assembly 10 is such that the two pins 80 in each load transferring member 50 are circumferentially opposed from one another and project into two adjacent bays 30, thereby at least partially supporting two of the buckets 12.

In this embodiment, the pins 80 are made of a suitably chosen material to withstand the dynamic stresses and forces applied onto the pins 80 during centrifugation. To this end for example, and without limitation, the pins 80 may be made of material having a relatively high hardness, such as titanium or stainless steel. The main portion of each of the load transferring members 50 defined by the arms 54 and central leg 52 may be made of the same material or a different material. For example, the main portion may be made of a material such as a metal having a hardness lower than that of the pins 80, such as, and without limitation, aluminum.

During set-up, and prior to centrifugation, the buckets 12 are received in respective bays 30, with each of the buckets 12 being oriented to permit engagement of the pins 80 with the receiving apertures 82 of the buckets 12. In this particular embodiment, the buckets 12 are oriented in a generally vertical direction (as shown in FIG. 1) such that the pins 80 are received within open portions of generally U-shaped bushings 86 extending from the side walls 83 of the buckets 12 and which define the apertures 82. During centrifugation, the closed portions of the bushings 86 engage the pins 80, thereby permitting secure engagement between the pins 80 and the buckets 12.

While the load transferring members 50 of this exemplary embodiment include bucket supports in the form of pins 80 engageable with cooperating receiving apertures 82 of the buckets 12, it is contemplated that they may take other forms or include additional components. For example, and without limitation, the bucket supports may be in the form of or include apertures (not shown) configured to receive corresponding pins or projections (not shown) of the buckets 12.

Figure 3:
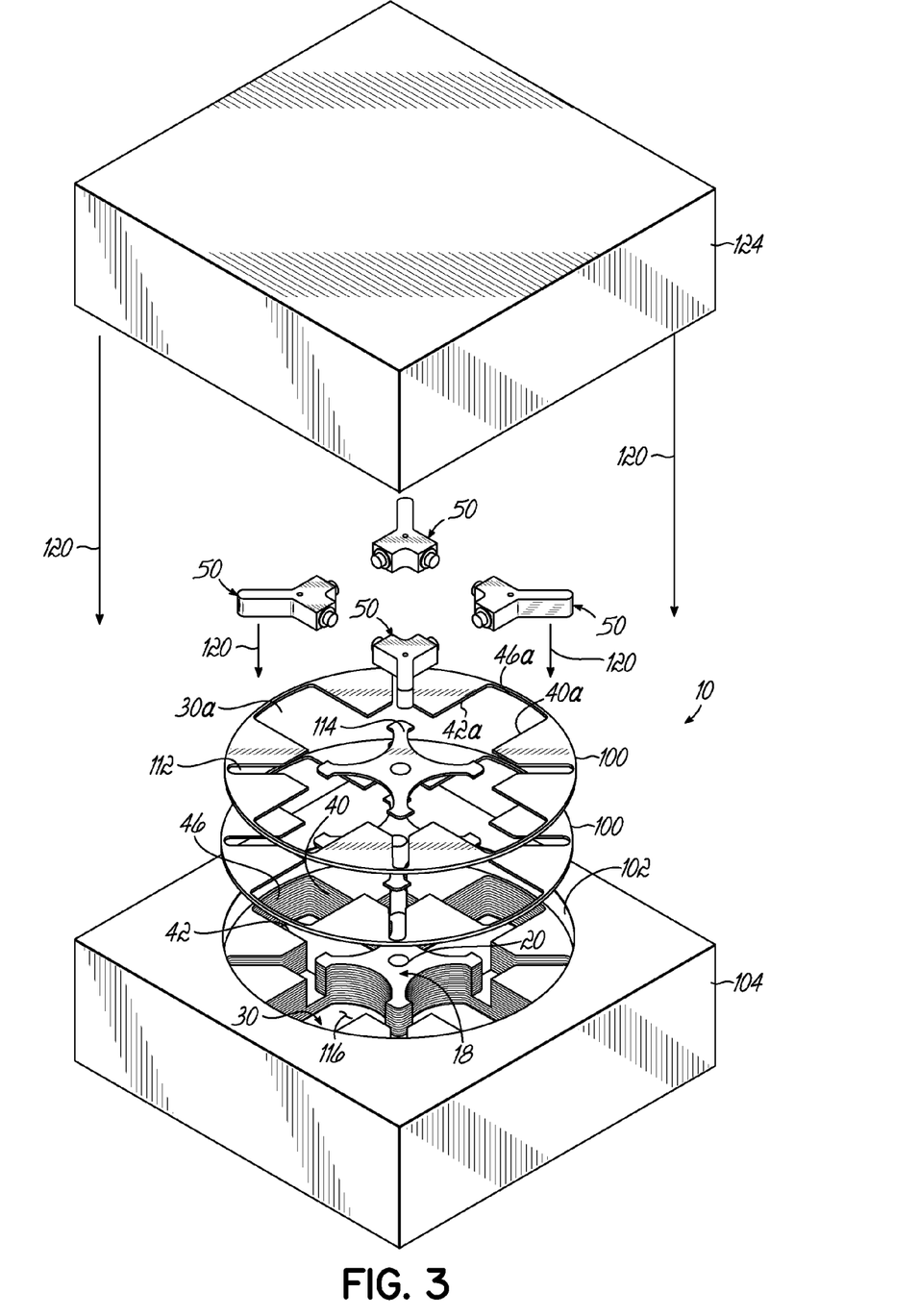
FIG. 3 is a schematic illustration of a method for forming the rotor assembly of FIG. 1.
Figure 4:
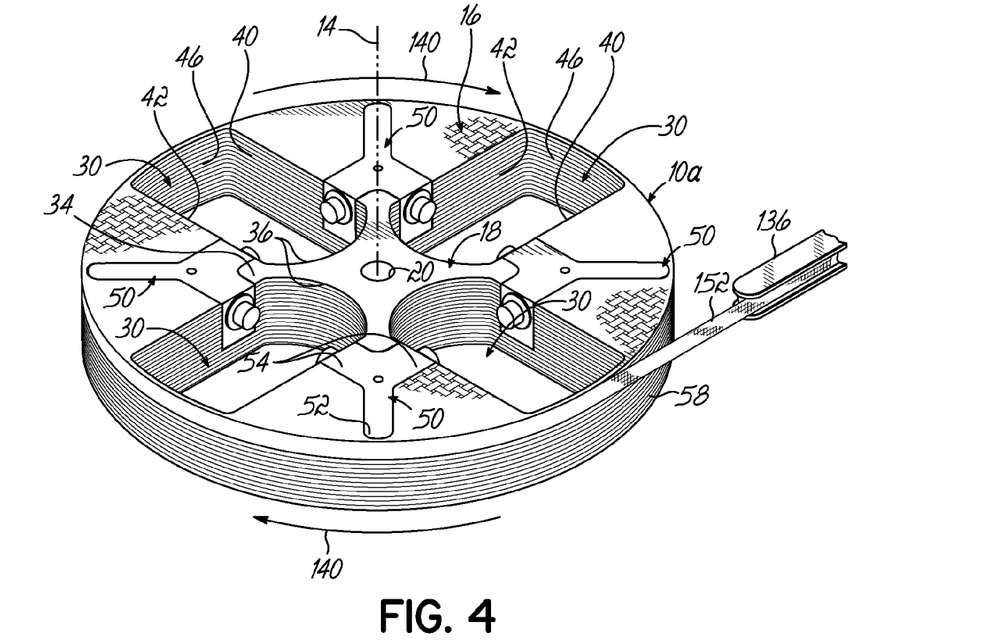
FIG. 4 is a perspective view illustrating winding of a reinforcement layer of the rotor assembly of FIG. 1.
Figure 5:
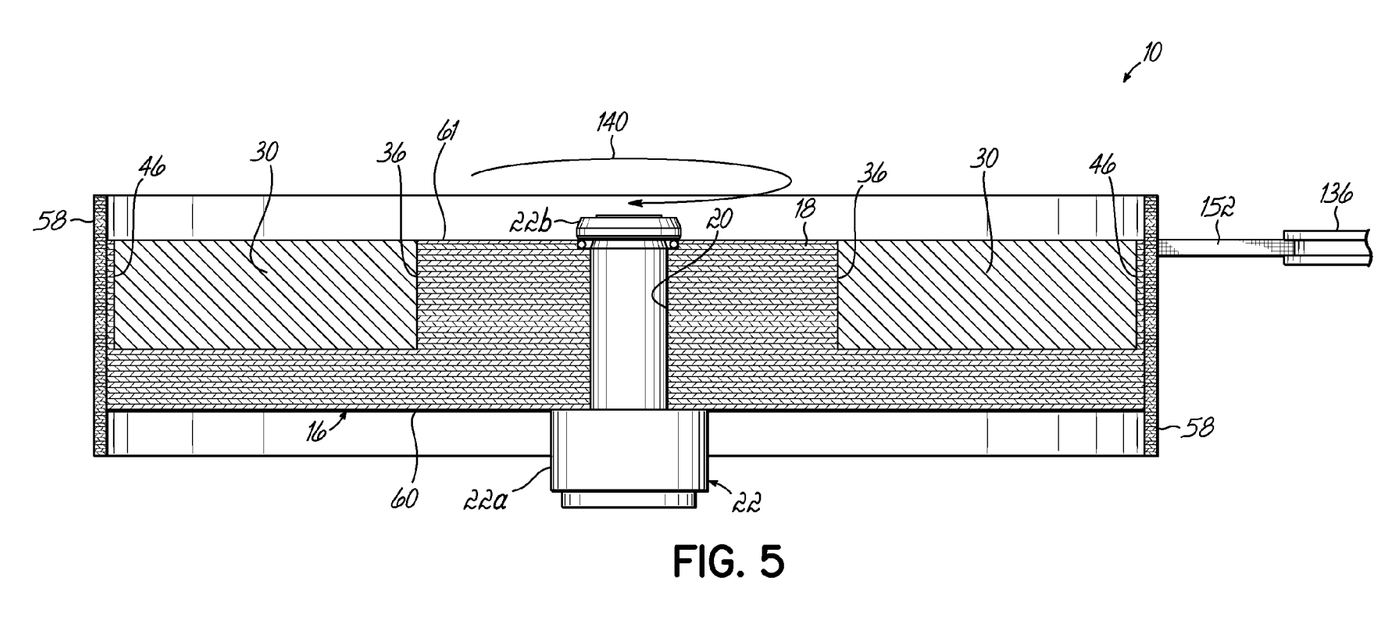
FIG. 5 is a cross-sectional view taken generally along line 5-5 of FIG. 1, showing in addition, a guide for forming a reinforcement layer of the motor assembly.

As noted above, the exemplary embodiment of FIGS. 1, 1A, and 2 includes a rotor body 16 that is compression-molded. In this embodiment, moreover, the rotor body 16 is formed from compression-molded resin-coated carbon fiber laminates. In this regard, FIGS. 3-5 illustrate an exemplary method for forming the rotor assembly 10 of FIGS. 1, 1A, and 2. With particular reference to FIG. 3, a first plurality of layers 100 of resin-coated carbon fiber laminates may be stacked within a chamber 102 of a first mold part 104. Each of the layers 100 of this embodiment includes a first plurality of openings or cut-out portions 30a corresponding to the bays 30 and thus including respective side walls 40a, 42a and back walls 46a, respectively corresponding to the side walls 40, 42, and back walls 46 defining the bays 30 of the rotor assembly 10. To this end, the layers 100 are stacked such that the side walls 40a, 42a and back walls 46a of adjacent layers 100 are in registration with one another.

Each of the layers 100, moreover, includes a second plurality of openings or cut-out portions 112 shaped to receive the load transferring members 50. In this exemplary embodiment, accordingly, the openings 112 are shaped to snugly receive the exemplary generally Y-shaped load transferring members 50 described above. In one aspect, a pair of adjacent layers 100 may be shaped differently from one another. For example, and without limitation, a first layer may be shaped to define a bottom surface 116 of a bay 30, while a layer adjacent thereto will be shaped to define portions of the side walls 40, 42, and back wall 46 of the same bay 30. A second plurality of layers 114 are stacked to define the central hub 18 of the rotor assembly 10 and may include materials similar to or different from those defining the first plurality of layers 100. Accordingly, when stacked together, the plurality of layers 100, 114 jointly define the rotor body 16 seen, for example, in FIG. 4.

In another aspect of this embodiment, two adjacent layers 100 and/or layers 114 may have respective laminates with warp and weft fibers oriented in various directions. Accordingly, the varying orientation of these fibers throughout the stack of layers 100 and/or the stack of layers 114 results in a rotor body 16 having uniform strength in different directions.

The load transferring members 50 are received, as noted above, within the openings 112. A rotor hub 22a and a complementary rotor hub retainer 22b are engaged with the bore 20 defined by the layers 114 and coupled to one another to define the coupling 22 (FIG. 1). With the layers 100, hub and retainer 22a, 22b, and load transferring members 50 assembled together as generally shown in FIG. 3, a second mold part 124 is moved toward the first mold part 104 (arrows 120) and pressure is caused to be applied by the first and second mold parts 104, 124 onto the layers 100 and 114, onto the load transferring members 50, and onto the hub and retainer 22a, 22b. The application of pressure and heat results in the individual layers 100, 114 being joined together to respectively form the rotor body 16, including the central portion 18 of the rotor body 16. Moreover, the applied pressure and heat integrally mold the load transferring members 50 and hub and retainer 22a, 22b with the rotor body 16. These components thereby define a partial rotor assembly generally designated by the numeral 10a and illustrated in FIG. 4. It is contemplated that, alternatively, the hub and retainer 22a, 22b may be engaged with the bore 20 after compression-molding of the other portions of rotor body 16. It is also contemplated that only one of the hub or retainer 22a, 22b may be co-molded with the rotor body 16. For example, an alternative embodiment would include co-molding the hub retainer 22b with the rotor body 16. In such embodiment, the hub 22a would be coupled to the hub retainer 22b subsequent to compression molding of the rotor body 16, for example through cooperating threads of the hub and retainer 22a, 22b. This would facilitate, for example, interchanging the hub 22a to permit engagement with centrifuge spindles (not shown) of different dimensions and/or shapes.

With particular reference to FIGS. 4 and 5, a guide 136 is used to form the reinforcing layer 58 (FIG. 1). Guide 136 directs material defining the reinforcement layer 58 around the outer perimeter of the partial rotor assembly 10a. In this embodiment, for example, the material is wound by holding the guide 136 in a relatively fixed position while rotating the partial rotor assembly 10a about its central rotational axis 14 in the general direction of arrows 140. It is contemplated that, alternatively, the material may be wound by rotating partial rotor assembly 10a in a direction opposite from that shown in FIG. 4. It is also contemplated that the material may be additionally or alternatively wound by holding the partial rotor assembly 10a in a relatively fixed position while rotating the guide 136 circumferentially around the perimeter of the partial rotor assembly 10a.

In one specific embodiment, the material defining the reinforcement material layer 58 (FIG. 1) includes resin-coated fiber tows 152, such as 24K carbon fiber tows commercially available from Toray Industries, Inc. of Tokyo, Japan. After the carbon fiber tows have been wound around the outer perimeter of partial rotor assembly 10a as discussed above, the material defining the reinforcement layer 58 may be cured by applying heat and/or pressure to the partial rotor assembly 10a to thereby form a substantially integral structure.

FIG. 5 illustrates a reinforcement layer 58 that extends, in the axial direction, beyond the top and bottom faces 61, 60 of the rotor body 16. To this end, an apparatus for forming the reinforcement layer 58 may include a fixture (not shown) that facilitates winding of the tow 52 beyond the top and bottom faces 61, 60. In this regard, for example, the fixture (not shown) may be separated from the reinforcement layer 58 and rotor body 16 subsequent to curing of the reinforcement layer 58.

Figure 5A:
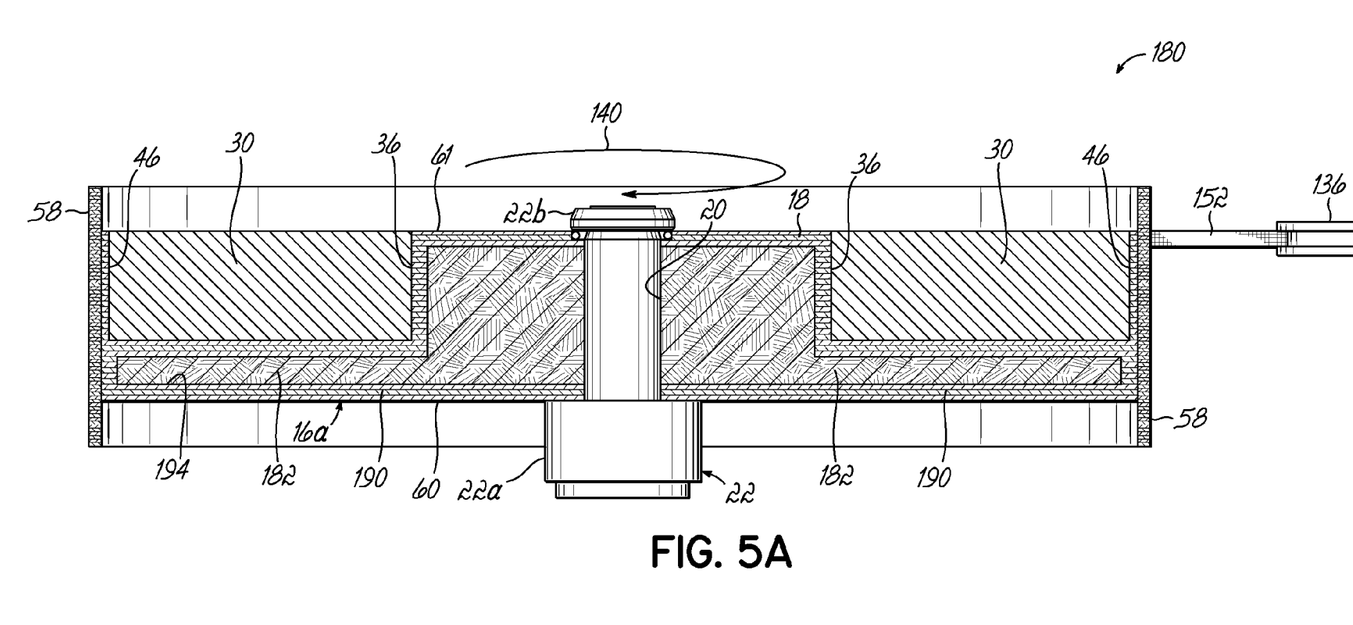
FIG. 5A is a view similar to FIG. 5, illustrating another exemplary embodiment of a rotor assembly.

FIG. 5A illustrates another exemplary embodiment of a rotor assembly 180, similar to rotor assembly 10 of the preceding figures, but having a rotor body 16a formed with filler material 182 disposed between layers, generally assigned the numeral 190 in this figure, and which may, for example, include discontinuous pieces of carbon fiber laminate material or chopped resin-coated carbon fibers in a resin matrix. For ease of understanding, like reference numerals in FIG. 5A refer to like reference numerals in the preceding figures. Without limitation, the layers 190 may, for example, be stacked so as to form voids 194 between them and which receive the filler material 182.

Figure 5B:
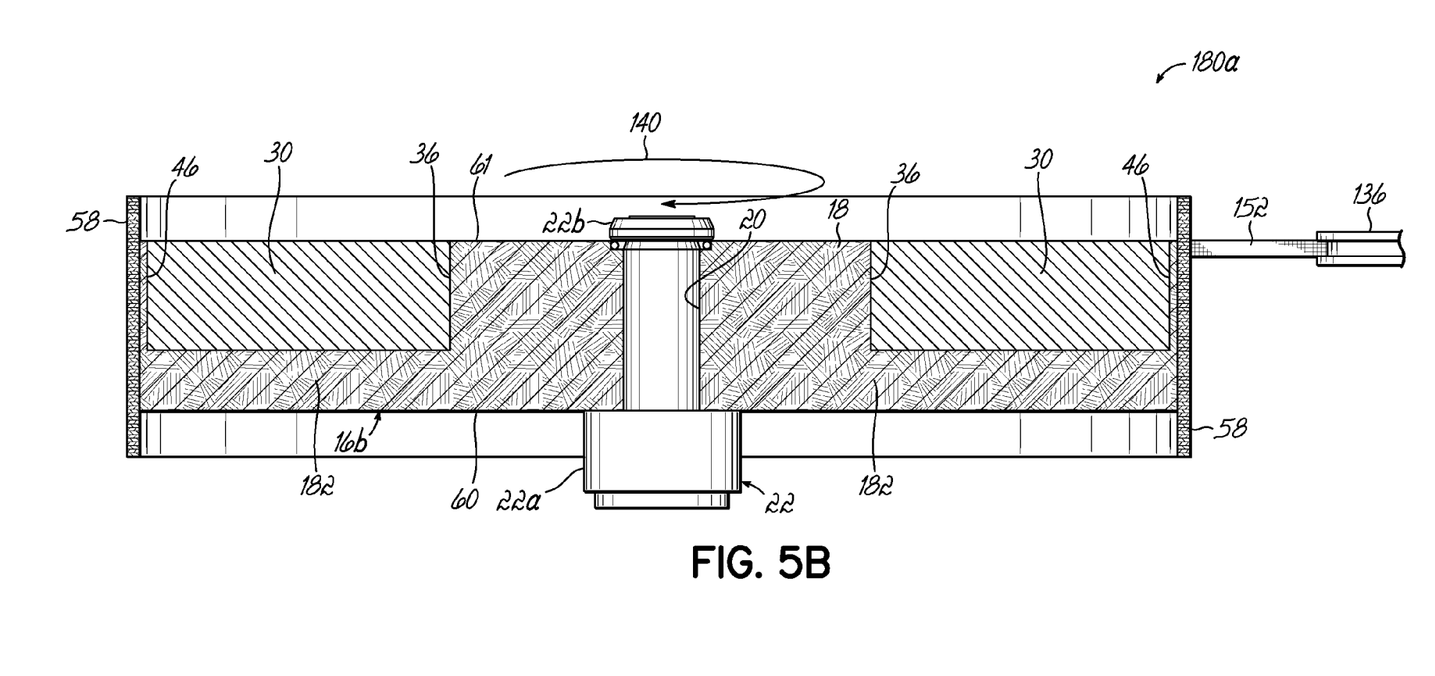
FIG. 5B is a view similar to FIG. 5, illustrating yet another exemplary embodiment of a rotor assembly.

Alternatively, another exemplary rotor assembly 180a may be formed by molding a rotor body 16b using discontinuous pieces of carbon fiber laminate material or chopped resin-coated carbon fibers in a resin matrix without any layers of carbon fiber laminate material, as depicted in FIG. 5B. A reinforcing layer 58 may thereafter be applied to the outer surface of the rotor body 16b, as described above.

Figure 6:
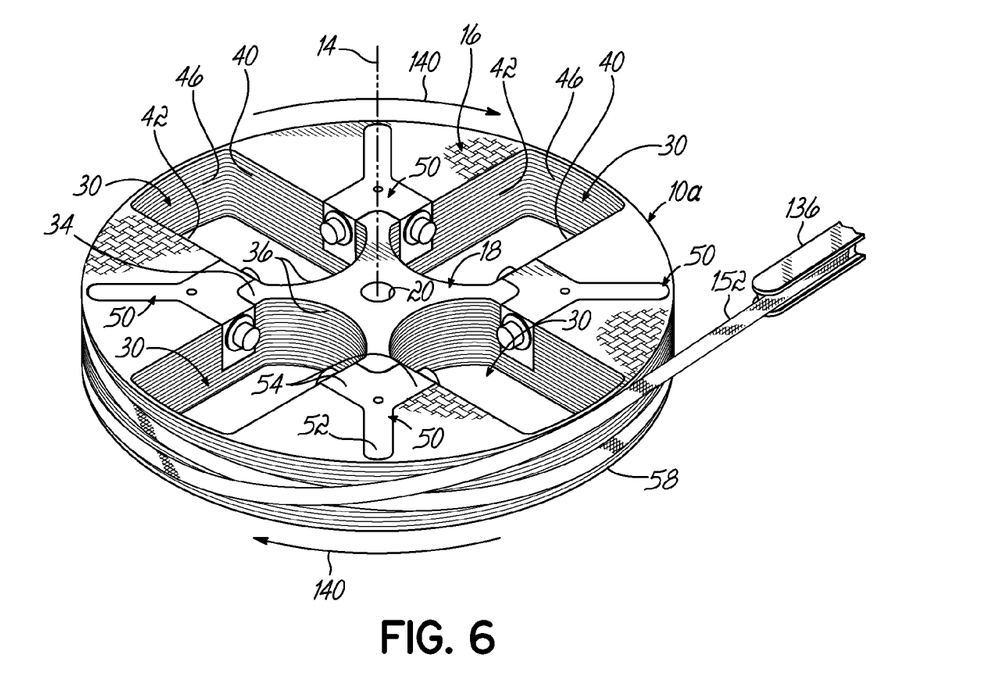
FIG. 6 is a view similar to FIG. 4, illustrating an alternative type of winding to define a reinforcement layer of the rotor assembly of FIG. 1.

While FIGS. 4-6 illustrate a tow 152 in the form of a continuous wide strand of material, this is intended to be illustrative rather than limiting, as the tow 152 may take any other form such as, and without limitation, a thin strand or filament. Moreover, although the exemplary tow 152 of FIGS. 4-6 is made of the resin-coated carbon fibers, those of ordinary skill in the art will appreciate that tow 152 may be made of other materials. For example and without limitation, the tow 152 could be made of other high strength fibers such as aramid fibers or UHMW (Ultra High Molecular Weight) polyolefin coated with a thermoplastic or thermosetting resin. With particular reference to FIG. 6, a variation of the winding method illustrated in FIGS. 4-5 includes helically winding a strand of the material defining the reinforcement layer 58.

While FIGS. 4-6 and the description thereof illustrate an exemplary method and exemplary materials for forming the rotor assembly 10, those of ordinary skill in the art will readily appreciate that the rotor assembly 10 may be formed by alternative methods and/or include different materials in addition to or instead of the materials described above. For example, and without limitation, an alternative rotor assembly may include a rotor body formed from or at least including a high-strength material such as a high strength-plastics, metal, fiberglass, Kevlar®, or other materials capable of resisting the forces associated with high-speed centrifugal rotation.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A centrifuge rotor comprising:
a compression-molded rotor body including a central portion defining an axis of rotation of said rotor body, and a plurality of bays each configured to receive a bucket therein;
a plurality of load transferring members integrally molded with said rotor body, at least one of said plurality of load transferring members being Y-shaped, thereby defining a central leg and a pair of arms extending therefrom, with said central leg extending radially outwardly from said pair of arms and with each of said pair of arms including a bucket support for supporting a pair of buckets in an adjacent pair of said plurality of bays, said pair of bucket supports permitting pivotal movement of the pair of buckets within the adjacent pair of said plurality of bays during rotation of said rotor body about the axis of rotation; and
a reinforcement layer extending circumferentially around an exterior of said rotor body.

2. The rotor of claim 1, wherein said rotor body includes carbon fiber.

3. The rotor of claim 2, wherein said rotor body includes resin-coated carbon fiber.

4. The rotor of claim 2, wherein said reinforcement layer includes a strand of carbon fiber extending continuously around the exterior of said rotor body.

5. The rotor of claim 1, wherein said reinforcement layer is integrally formed with said rotor body.

6. The rotor of claim 1, wherein said reinforcement layer includes a strand extending helically around the exterior of said rotor body.

7. The rotor of claim 1, wherein said bucket support includes a pin engageable with a corresponding aperture of the bucket.

8. The rotor of claim 1, wherein said rotor body includes a plurality of stacked layers of resin-coated carbon fibers, each of said layers having a shape that defines said plurality of bays and a plurality of openings associated with said plurality of load transferring members.

9. The rotor of claim 8, wherein said rotor body includes filler material between said layers.

10. The rotor of claim 9, wherein said filler material comprises discontinuous carbon fibers.

11. The rotor of claim 1, wherein said load transferring members are disposed symmetrically about the axis of rotation and adjacent said bays.

12. The rotor of claim 1, wherein at least one said load transferring members includes a pair of circumferentially opposed bucket supports in communication with a respective pair of bays for supporting a respective pair of buckets in said bays.

13. The rotor of claim 1, further comprising:
a plurality of buckets configured to hold centrifuge tubes and supported by said bucket supports.

14. A centrifuge rotor comprising:
a compression-molded rotor body including a central portion defining an axis of rotation of said rotor body, and a plurality of bays each configured to receive a bucket therein;
a plurality of load transferring members integrally molded with said rotor body with each of said plurality of load transferring members being located in a respective cavity formed in said rotor body with each of said cavities having an open end and an opposite closed end, and each of said plurality of load transfer members including a bucket support for supporting a bucket in a respective one of said plurality of bays, said bucket support permitting pivotal movement of the bucket within a respective one of said plurality of bays during rotation of said rotor body about the axis of rotation; and
a reinforcement layer extending circumferentially around an exterior of said rotor body.

15. The rotor of claim 14, wherein said bucket support includes a pin engageable with a corresponding aperture of the bucket.

16. The rotor of claim 14, wherein at least one said load transferring members includes a pair of circumferentially opposed bucket supports in communication with a respective pair of bays for supporting a respective pair of buckets in said bays.

17. The rotor of claim 14, further comprising:
a plurality of buckets configured to hold centrifuge tubes and supported by said bucket supports.

* * * * *

UNITED STATES PATENT AND TRADEMARK OFFICE
CERTIFICATE OF CORRECTION

PATENT NO. : 8,323,170 B2  
APPLICATION NO. : 12/429561  
DATED : December 4, 2012  
INVENTOR(S) : Sina Piramoon Page 1 of 1

It is certified that error appears in the above-identified patent and that said Letters Patent is hereby corrected as shown below:

Title page, Item (57), change "and each include a bucket support" to --and each includes a bucket support--.

In column 7, line 22, change "a high-strength material such as a high strength-plastics," to --a high-strength material such as high-strength plastics,--.

In claim 12, column 8, line 23, change "wherein at least one said load transferring members includes" to --wherein at least one of said load transferring members includes--.

In claim 16, column 8, line 50, change "wherein at least one said load transferring members includes" to --wherein at least one of said load transferring members includes--.

Signed and Sealed this  
Twenty-sixth Day of February, 2013

Teresa Stanek Rea  
*Acting Director of the United States Patent and Trademark Office*